(12) United States Patent
Kim (10) Patent No.: US 7,082,035 B2
(45) Date of Patent: Jul. 25, 2006

(54) LATCH DEVICE IN PORTABLE COMPUTER

(75) Inventor: Hyong-Kon Kim, Suwon (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/970,275

(22) Filed: Oct. 22, 2004

(65) Prior Publication Data

US 2005/0236848 A1   Oct. 27, 2005

(30) Foreign Application Priority Data

Apr. 27, 2004   (KR) ................. 10-2004-0029258

(51) Int. Cl.
*H05K 5/02*   (2006.01)
(52) U.S. Cl. ............... 361/726; 345/156; 292/251.5; 439/165
(58) Field of Classification Search ............. 345/88, 345/156; 361/679–687, 724–727; 292/251.5; 439/164–165
See application file for complete search history.

(56) References Cited

U.S. PATENT DOCUMENTS

| 5,548,478 A | * | 8/1996 | Kumar et al. ............ 361/681 |
| 2004/0062000 A1 | * | 4/2004 | Duarte ...................... 361/683 |
| 2005/0206615 A1 | * | 9/2005 | Tanimoto et al. ......... 345/156 |

* cited by examiner

*Primary Examiner*—Hung Van Duong
(74) *Attorney, Agent, or Firm*—Fleshner & Kim, LLP (57) ABSTRACT

The present invention relates to a latch device for a portable computer, a portable computer having same and methods thereof. Embodiments of a latch device for a portable computer having a display, which operates to be folded onto or unfolded with respect to a main body, can include first and second magnetic members correspondingly provided at one of the display and the main body, respectively. A magnetic force of the first and second magnetic members can be exerted therebetween when the display is folded onto the main body to cause the display to be engaged with the main body.

28 Claims, 6 Drawing Sheets

Fig. 1

Prior art

LATCH DEVICE IN PORTABLE COMPUTER

BACKGROUND OF THE INVENTION

1. Field of the Invention

The present invention relates to a portable computer, and more particularly, to a latch device for a portable computer, which causes a first body to be engaged with a main body of the portable computer.

2. Background of the Related Art

Generally, a portable computer is constructed such that a display has a shape corresponding to a shape of a main body of the portable computer and is connected to the main body to be folded onto or unfolded with respect to the main body. Latch devices are provided at a front end of the display and corresponding positions on the main body so that the display is engaged with the main body in the folded state (i.e., closed) to prevent the display from being inadvertently unfolded with respect to the main body. An example of the portable computer is a notebook computer.

Figure 1:
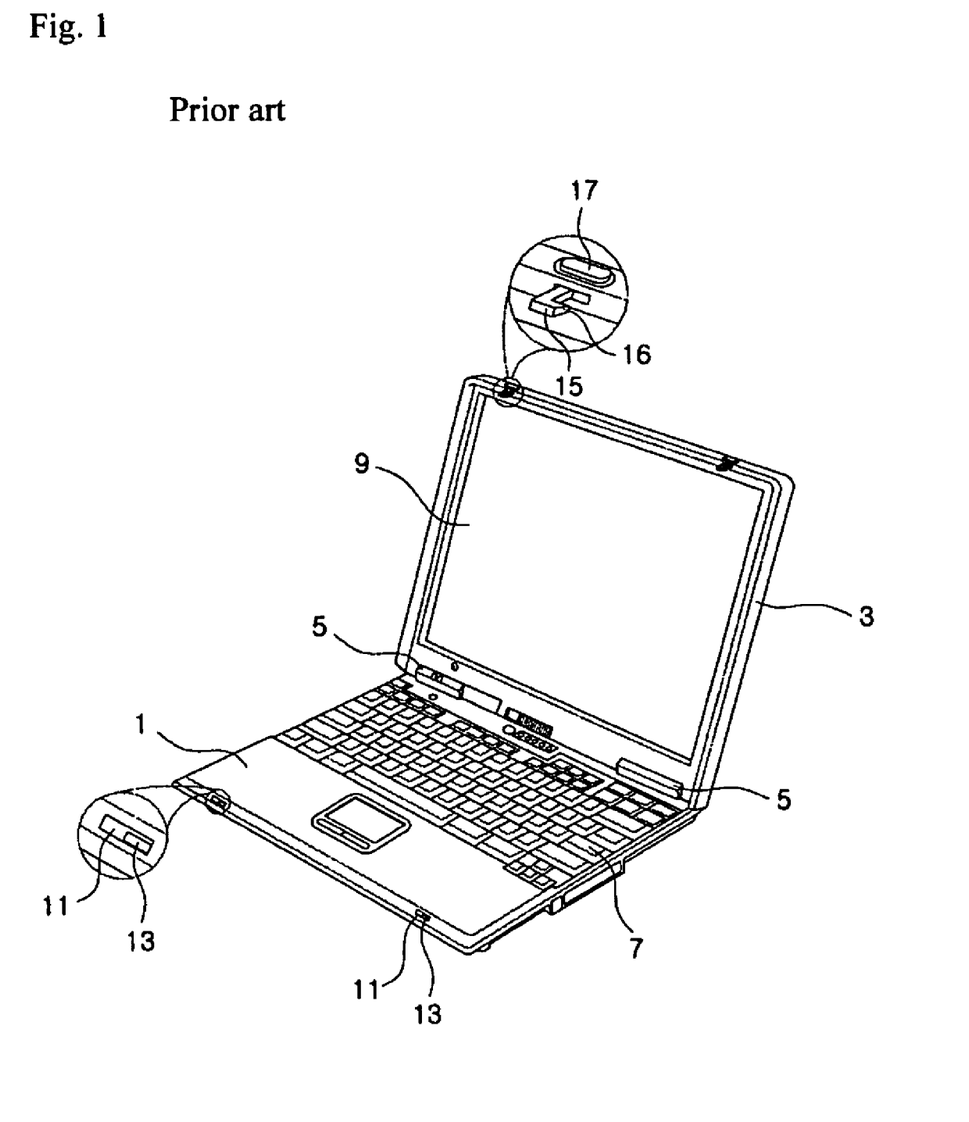
FIG. 1 is a diagram showing a perspective view of a conventional notebook computer.

FIG. 1 shows the configuration of a conventional notebook computer. As shown in FIG. 1, the notebook computer includes a main body 1 and a display 3. The main body 1 and the display 3 are connected to each other through a hinge 5 so that the display 3 can be kept safe when folded onto the main body 1 and used when unfolded with respect to the main body as shown in FIG. 1.

The main body 1 is formed to take the shape of a substantially flat plate, and has a main board and various parts for the notebook computer installed in an inner space of the main body 1. A keyboard 7 as an input device has a plurality of keys arranged in a plurality of rows and is provided on an upper face of the main body 1.

The display 3 is provided with a display screen 9. A liquid crystal display is usually used for the display screen 9, which displays a variety of information thereon. Signal connections between the display 3 and the main body 1 are made through the hinge 5.

Latch devices for causing the display 3 to be engaged with the main body 1 are correspondingly provided at a front end of the display 3 and a front end of the main body 1. That is, latch devices include catching grooves 11 and latches 15.

The catching grooves 11 are formed at the front end of the upper face of the main body 1. The catching grooves 11 are provided at both sides on the front end of the upper face of the main body 1 and open into the upper face. Catching steps 13 are formed within the catching grooves 11.

Latches 15 are provided at positions on the front end of a front face of the display 3 corresponding to the catching grooves 11 of the main body 1. A tip of each latch 15 is formed with a hook 16 that is selectively caught by the catching step 13 in the catching groove 11. The latches 15 are supported by springs applying force in a direction to catch the hooks 16 on the catching steps 13.

Release buttons 17 are provided to release the hooks 16 caught by the respective catching steps 13 when the display 3 is folded onto the main body 1. The release buttons 17 are provided at positions exposed to the outside. The release buttons 17 move integrally with the latches 15.

However, as described above, the prior art has various disadvantages. The hooks 16 of the latches 15 are caught by the catching steps 13 in the catching grooves 11 so that the display 3 can be engaged with the main body 1. However, when the engagement is made through the direct catching of the hooks 16 by the catching steps 13, an excessive force exerted on a structure because of a user's carelessness may result in changes of the installation states of the latches 15 or damage thereto. In a severe case, the catching grooves 11 may be damaged.

Further, since the catching grooves 11 and the latches 15 directly appear on the main body 1 and the display 3, respectively, an external appearance is deteriorated. Particularly, when the notebook computer is used by unfolding the display 3 with respect to the main body 1, the latches 15 are exposed directly to the outside. Since the latches 15 protrude outside the display 3, the clothes of users or objects moving around the computer can be caught by the latches and may be damaged, or the latches 15 may be broken.

In addition, since the latches 15 are provided at both lateral ends of the display 3, it can be inconvenient to release and unfold the display 3 engaged with the main body 1 because coordinated force must be provided in a plurality of different directions. For example, the engaged state is released only when the release buttons 17 are manipulated by thumbs of both hands while the main body 1 is pressed down by other fingers of the both hands. Then, once the engaged state is released, the main body 1 should be pressed down by one hand and the display 3 should be unfolded and lifted by the other hand.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a latch device that can cause a first body of a portable computer to be engaged with a main body of the portable computer without direct contact.

Another object of the present invention is to provide a latch device that does not extend outside or appear on external appearances of a display body and a main body of a portable computer.

Another object of the present invention is to provide a latch device that includes first and second magnetic members.

Another object of the present invention is to provide a latch device that includes an internal latch device for a portable computer.

Another object of the present invention is to provide a latch device, having a less complex operation for unfolding the display with respect to the main body of the portable computer.

Another object of the present invention is to provide a latch device for the portable computer according to the present invention that can increase the durability of the latch device.

In order to achieve at least the above objects in a whole or in part according to an aspect of the present invention for achieving the objects, there is provided a latch device for a portable computer having a display configured to be folded and unfolded about a hinge with respect to a main body of the portable computer, the latch device includes a magnet provided at an inner portion of one of the display or the main body and a magnetic member provided at an inner portion of the other of the main body or the display corresponding to the inner portion of the display or the main body provided with the magnet, wherein the magnet is configured to exert a magnetic force on the magnetic member when the display is folded onto the main body so as to cause the display to be engaged with the main body.

To further achieve at least the above objects in a whole or in part according to an aspect of the present invention for achieving the objects, there is provided a latch device that includes a first body portion and a second body portion coupled together to move between an open position and a closed position, a first member installed in the first body portion, a second member installed in the second body portion, wherein the first and second member are configured to engage each other using a magnetic force to maintain the first and second body portions in the closed position.

To further achieve at least the above objects in a whole or in part according to an aspect of the present invention for achieving the objects, there is provided a latch device for a portable computer having a display configured to be folded and unfolded with respect to a main body of the portable computer, the latch device including a first magnetic member proximate to an inner portion of a case of the display and a second magnetic member proximate to an inner portion of a case of the main body and positioned on the case of the main body so as to correspond to a position of the magnet on the case of the display when the display is folded with respect to the main body, wherein the magnetic members are configured to exert a magnetic force on the each other when the display is folded with respect to the main body so as to maintain a folded position of the display with respect to the main body.

To further achieve at least the above objects in a whole or in part according to an aspect of the present invention for achieving the objects, there is provided a method of assembling a portable computer that includes coupling a first body portion and a second body portion together to move between an open position and a closed position, providing a first member in the first body portion, providing a second member in the second body portion, wherein the first and second member are configured to engage each other using a magnetic force to maintain the first and second body portions in the closed position.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
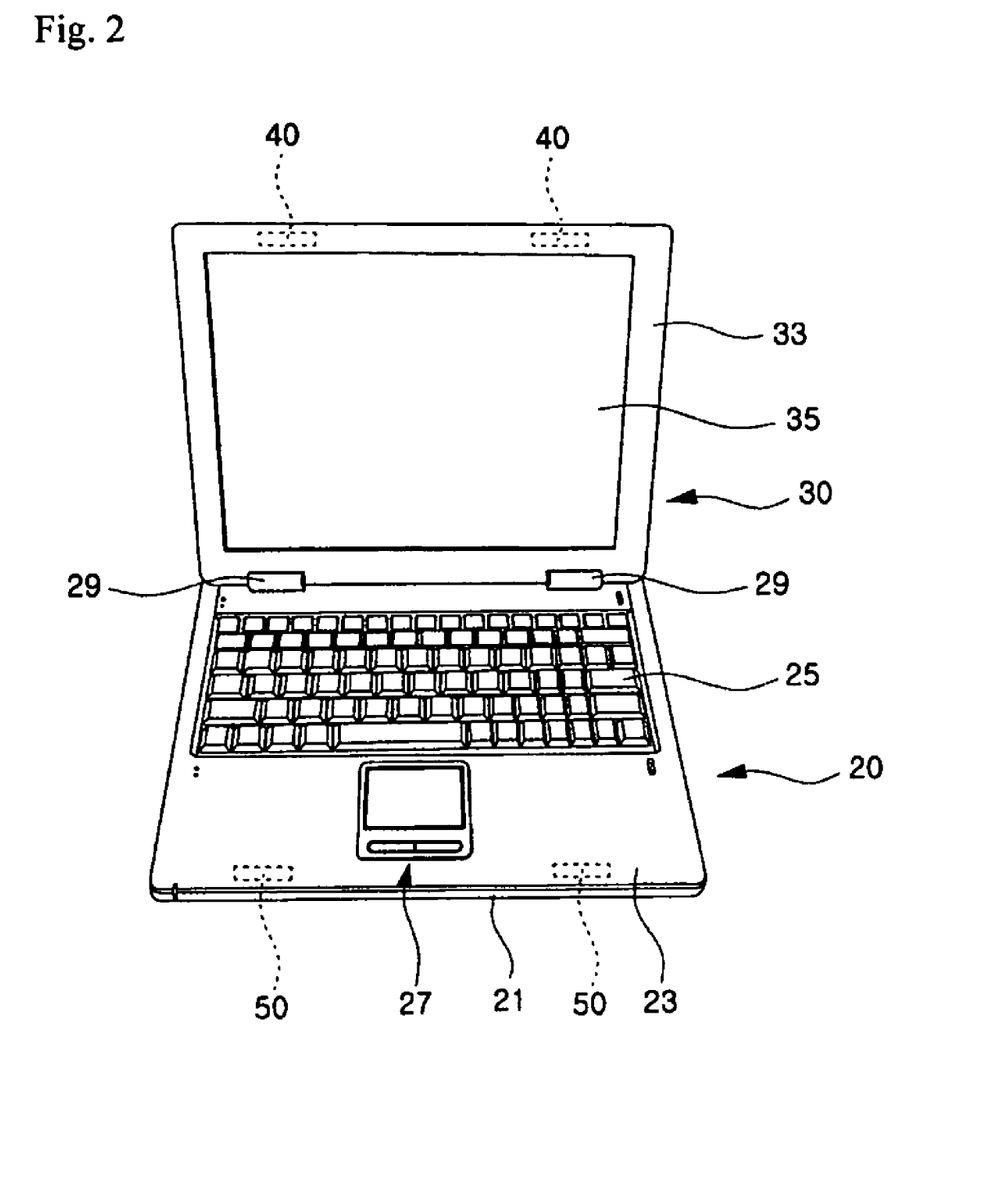
FIG. 2 is a diagram showing a perspective view of an example of a latch device of a portable computer according to a preferred embodiment of the present invention.
Figure 3:
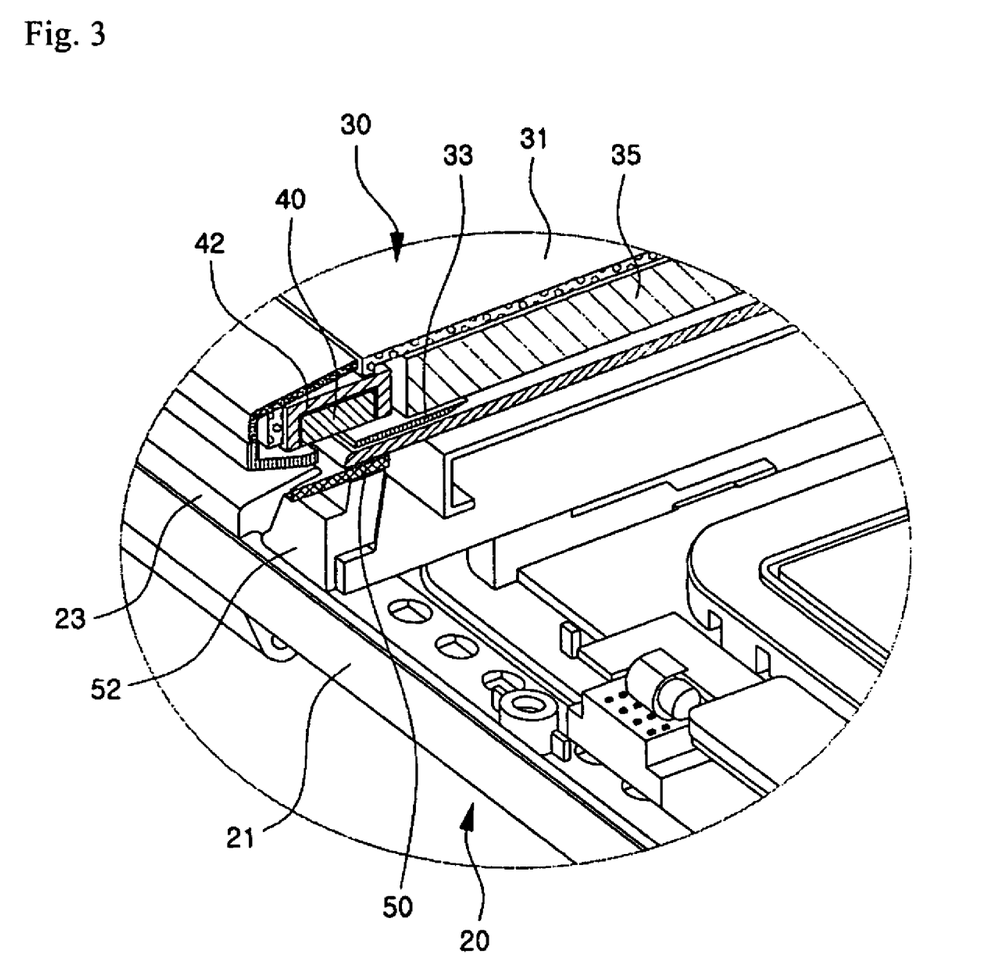
FIG. 3 is a diagram showing a partial cut-away sectional view of a portion of the latch device according to a preferred embodiment of the present invention.

FIG. 2 is a perspective view showing an example of a portable computer employing a latch device according to an embodiment of the present invention. FIG. 3 is a partial cut-away sectional view showing a portion of the latch device according to the embodiment of FIG. 2.

As shown in FIGS. 2–3, a portable computer can have a main body 20 and a first body such as a display 30 coupled to each other (e.g., at a rear end of the main body 20) through a hinge 29. The display 30 can be folded onto or unfolded with respect to the main body 20 about the hinge 29.

The main body 20 can have an external appearance defined by a lower case 21 and an upper case 23. For example, the main body 20 can take the shape of a substantially flat hexahedron. However, the present invention is not intended to be so limited. In addition, a variety of parts (e.g., a main board) are installed within the lower and upper cases 21 and 23.

An input device (e.g., a keyboard 25) can be provided on the upper case 23. The keyboard 25 can have a plurality of keys arranged in a plurality of rows. The keyboard 25 can be disposed at a relatively rear side with respect to the center of an upper face of the upper case 23. A pointing device 27 can be provided at the center of a front end of the upper face of the upper case 23. The pointing device 27 can be a "touch pad" or the like.

The display 30 is preferably pivotably connected to the rear end of the main body 20 through the hinge 29. An external appearance of the display 30 can be defined by an outer case 31 and a front case 33. The front case 33 can serve to shield and secure edges of a display unit 35.

The display unit 35 is preferably installed to be exposed to a front face of the display 30. The display unit 35 can occupy the substantially entire front face of the display 30. A liquid crystal display or the like can be used for the display unit 35.

The display 30 can pivot on the hinge 29 to be folded onto or unfolded with respect to the main body 20. As shown in FIG. 2, the portable computer is used in a state where the display 30 is unfolded with respect to the main body 20.

When the portable computer is kept safe or carried, the display 30 is preferably folded onto the main body 20. At this time, structures for urging or preventing the display 30 from being inadvertently unfolded with respect to the main body 20 can be provided at corresponding positions on the main body 20 and the display 30.

As shown by dotted lines in FIG. 2, first and second magnetic members (e.g., magnets 40 and metal plates 50) can be respectively installed at corresponding positions on one or both sides of the front end of the front face of the display 30 and on one or both sides of the front end of an upper face of the main body 20. In the embodiment of FIG.

2, the magnets 40 are installed within the display 30, and the metal plates 50 are installed within the main body 20. However, the installation positions of the metal plates 50 and the magnets 40 may be reversed, or the magnets 40 may be installed on both the main body 20 and the display 30. However, the present invention is not intended to be so limited. For example, electromagnetic devices or structures can be used for the first and second magnetic members. It will be apparent that if the magnets 40 are installed on both the main body 20 and the display 30, they should be installed such that opposite polarities thereof face each other.

It is preferred that the magnets 40 installed within the display 30 be permanent magnets. The magnets can be seated in additional holders 42 and then placed within spaces formed between the outer case 31 and the front case 33. The holders 42 can be preferably formed through injection molding out of a synthetic resin. One surface of each holder 42, (e.g., a surface thereof facing the main body 20), can be open so that the relevant magnet 40 is exposed. As shown in FIG. 3, the magnets 40 can be installed in the display corresponding to a gap between the front case 33 and the display unit 35. Alternatively, the magnets 40 can correspond to a gap formed in the front case 33 or between the front case 33 and the outer case 31.

It is preferred that the metal plates 50 installed within the main body 20 be installed on or near a bottom face of the upper case 23. For example, additional supports 52 may be used to position the metal plates 50 on the bottom face of the upper case 23 within a space between the upper case 23 and the lower case 21. The supports 52 may be formed integrally with the upper case 23, or formed separately therefrom and then fixed thereto. In addition, the holders 42 and supports 52 can be formed from a plurality of separate pieces.

Figure 5:
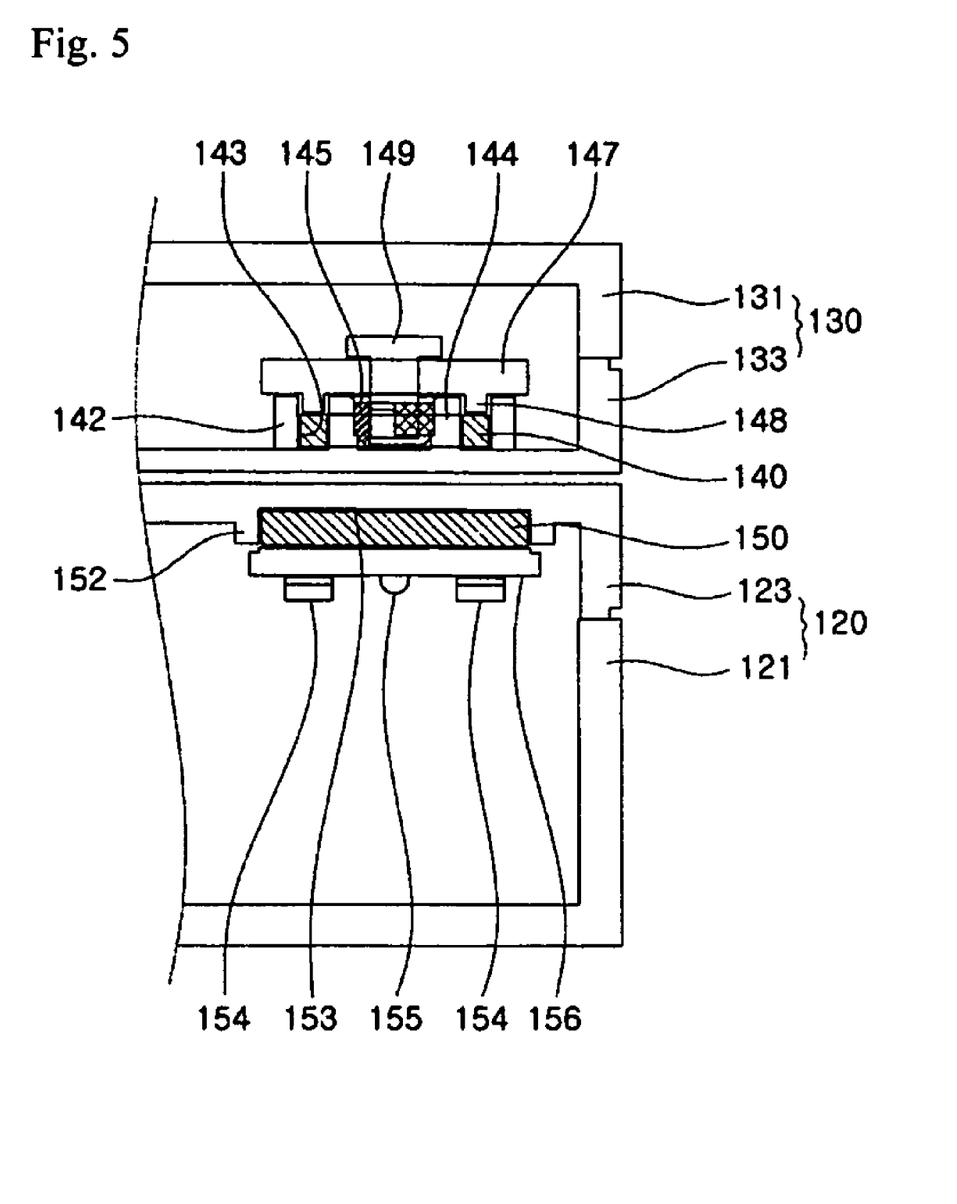
FIG. 5 is a diagram showing a longitudinal sectional view of a latch device according to another embodiment of the present invention.
Figure 6:
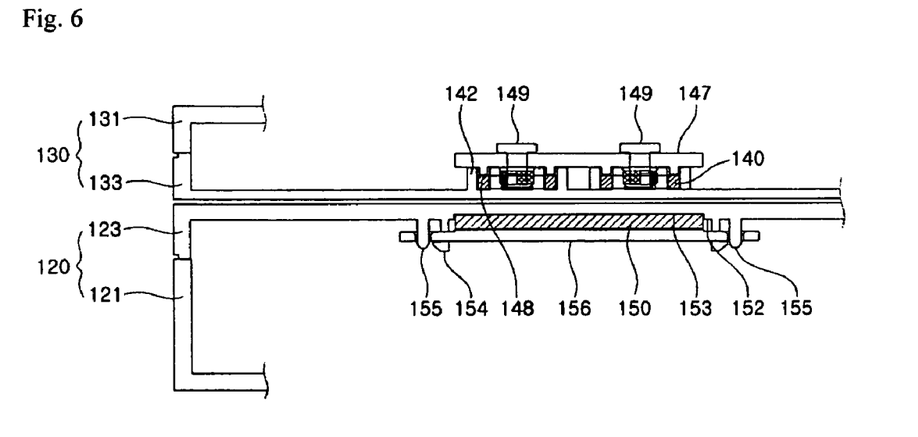
FIG. 6 is a diagram showing a cross sectional view of a latch device according to another embodiment shown in FIG. 5.
Figure 7A:
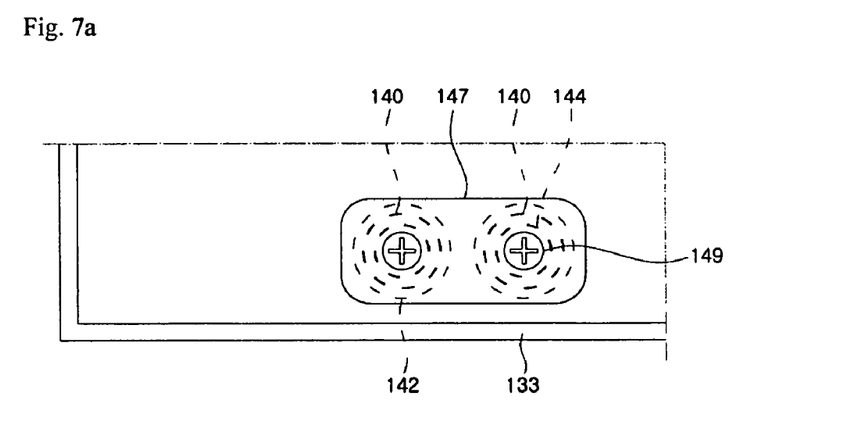
FIG. 7a is a diagram showing an inner face of a front case on which magnets are installed in the latch device according to another embodiment shown in FIG. 5.
Figure 7B:
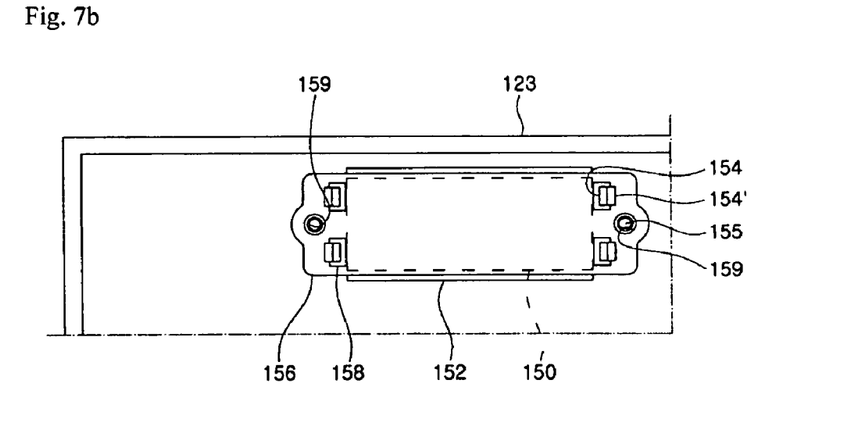
FIG. 7b is a diagram showing an inner face of an upper case provided with metal plates in the latch device according to another embodiment shown in FIG. 5.

FIGS. 5 to 7 are diagrams that show a latch device according to another embodiment of the present invention. As shown in FIGS. 5–7, a main body 120 of a portable computer can have an external appearance defined by a lower case 121 and an upper case 123. A display 130 (e.g., first body) can be folded and unfolded with respect to the main body 120 and have an external appearance defined by an outer case 131 and a front case 133.

When the portable computer is stored or carried, the display 130 is folded onto the main body 120. At this time, structures for preventing the display 130 from being inadvertently unfolded with respect to the main body 120 can be provided at corresponding positions on the main body 120 and the display 130.

For example, first and second magnetic members (e.g., magnets 140 and magnetic metal plates 150) can be installed in at lease one corresponding position (e.g., on both sides) of a front end of a front face of the display 130 and a front end of an upper face (e.g., on both sides) of the main body 120, respectively. Thus, first and second magnetic members such as magnets, electromagnetic devices, conductive materials or the like can be at corresponding positions in the display 130 and main body 120. In one embodiment, the magnets 140 are installed within the display 130, and the metal plates 150 are installed within the main body 120. Alternatively, the magnets 140 and the metal plates 150 may be respectively provided in the display 130 and the main body 120. Further, electromagnetic devices and/or conductive materials may be respectively provided in the main body 120 and display 130.

It is preferred that the magnets 140 installed within the display 130 be permanent magnets. The magnets 140 can be seated in seating portions 142 formed integrally with the front case 133. The seating portions 142 are generally formed to have a corresponding shape such as a rectangle. Seating spaces 143 can be formed within the seating portions 142 to accommodate the magnets 140 therein. Although the magnets 140 are generally constructed in the form of a ring in this embodiment, the present invention is not intended to be so limited.

Fastening bosses 144 can be formed within the seating spaces 143. Metal inserts 145 are preferably provided in the fastening bosses 144. An inner peripheral surface of each of the fastening bosses 144 can be formed with threads. In this embodiment, two fastening bosses 144 are formed within each of the seating spaces 143. However, the present invention is not intended to be so limited. For example, the number of fastening bosses 144 may vary according to the area of the seating portion 142.

The magnets 140 installed in the seating spaces 143 of the seating portions 142 can be shielded by shield plates 147. The shield plates 147 are preferably made of a material through which magnetic forces of the magnets 140 impinging thereon are reduced, cannot exit or cannot penetrate. This allows the magnetic forces (e.g., most) of the magnets 140 to be transferred to a front face of the front case 133. Inner surfaces of the shield plates 147 can be provided with pressing protrusions 148 that press the magnets 140 installed in the seating portions 142 so that the magnets 140 are held or cannot move. In this embodiment, the pressing protrusions 148 generally take the shape of a ring. However, the present invention is not intended to be so limited.

The shield plates 147 can be coupled using fasteners 149 or the like. The fasteners 149 can penetrate through the shield plates 147 and be fastened to the fastening bosses 144 so that the shield plates 147 can be coupled to the seating portions 142.

It is preferred that the metal plates 150 installed within the main body 120 be installed on or nearby a bottom face of the upper case 123. To this end, seating portions 152 can also be formed on the bottom face of the upper case 123. Seating spaces 153 for accommodating the metal plates 150 can be provided in the seating portions 152. The seating spaces 153 are preferably formed to be slightly recessed on the bottom face of the upper case 123.

Catching hooks 154 can be provided on both ends of each of the seating spaces 153. The catching hooks 154 can be formed to extend from the bottom face of the upper case 123 toward the lower case 121. A catching projection 154' or the like can be formed at a tip of each of the catching hooks 154. The catching hooks 154 can secure covers 156.

Guide bosses 155 can be provided at portions adjacent to the catching hooks 154. The guide bosses 155 can be formed to protrude vertically from the bottom face of the upper case 123 in the same manner as the catching hooks 154. The guide bosses 155 may be provided at any positions around the seating portions 152. However, if the seating portions 152 are formed to be elongated in the form of a rectangle as in the embodiment of FIG. 5, it is preferred that the guide bosses be provided at both ends of each seating portion 152, which are spaced apart far away from each other.

The metal plates 150 seated in the seating portions 152 can be supported by the covers 156. That is, the covers 156 can shield the seating portions 152 to hold the metal plates 150 or to prevent the metal plates 150 from escaping from the seating portions 152. The covers 156 are perforated to have catching holes 158. The catching hooks 154 preferably penetrate through and are caught by the catching holes 158. The catching holes 158 can be equal in number to the number of catching hooks 154.

The covers 156 can be formed with guide holes 159 through which the guide bosses 155 penetrate. The guide holes 159 can serve to guide installation positions of the covers 156 upon mounting of the covers 156.

Operations of embodiments of latch device for a portable computer according to the present invention will now be described. Operations will be described using and can be applied to the latch device embodiments of FIGS. 2–7b. However, the present invention is not intended to be so limited.

Figure 4:
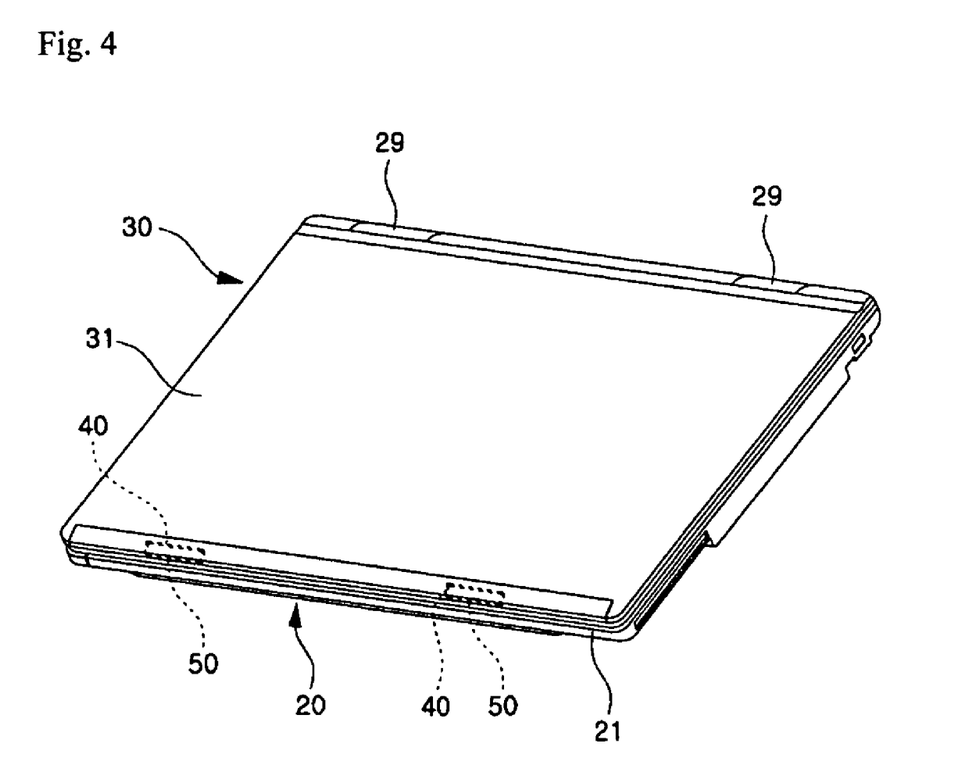
FIG. 4 is a diagram showing a state where a display is engaged with a main body in the portable computer employing the latch device according to a preferred embodiment of the present invention.

As shown in FIG. 4, in embodiments of a latch device, magnetic forces acting between the first and second magnetic members (e.g., the magnets 40, 140 and the metal plates 50, 150) in a state where the display 30 is folded and sufficiently near or seated on the upper face of the main body 20 can reduce the possibility or prevent the display 30 from being inadvertently unfolded with respect to the main body 20. In such a state, the display 30 can remain closed by magnetic forces of the first and second magnetic members.

As the display 30 is seated on the upper face of the main body 20, the magnets 40 provided in the display 30 can be placed at positions corresponding to the metal plates 50 provided in the main body 20. Therefore, the magnetic forces of the magnets 40 can act on the metal plates 50 so that the metal plates 50 tend to move toward the magnets 40.

In such a state, the display 30 can adhere to the main body 20 using the magnetic forces of the magnets 40. Only when a force higher than the magnetic forces of the magnets 40 is exerted, the front end of the display 30 can be separated from the front end of the main body 20.

In order for a user to unfold the display 30 with respect to the main body 20, the user can exert force on the display 30 in a direction away from the main body 20. Alternatively, the user can press down the main body 20 with one hand and cause the display 30 to pivot on the hinge 29 with the other hand. This is because embodiments of latch devices use no mechanically fastening structure and uses only the magnetic forces of the magnets 40. Further, when the display 30 is folded onto the main body 20 by the user for protection or to safekeep or carry the portable computer, the magnetic forces of the magnets 40 draw the metal plates 50 so that the display 30 adheres to the main body 20.

With respect to the embodiment of FIG. 5, first, the magnets 140 can be seated in the seating spaces 143 of the seating portions 142 and the shield plates 147 seated on the seating portions 142. Then, the fasteners 149 can penetrate through the shield plates 147 for fastening to the inserts 145 of the fastening bosses 144.

In the state where the metal plates 150 are seated in the seating portions 152 formed in the upper case 123, the covers 156 can be coupled to the catching hooks 154. That is, the catching hooks 154 can be inserted into the catching holes 158 of the cover 156 so that the catching projections 154' penetrate through the catching holes 158 and are caught by the covers 156. The guide bosses 155 can be inserted into the guide holes 159 to guide the catching of the catching hooks 154 by the catching holes 158.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a latch device for the portable computer and methods thereof according to the present invention have various advantages. Embodiments of a latch device and methods according to the present invention do not use mechanical fastening structures when the portable computer is closed or the display is seated onto and engaged with the main body. Accordingly, there is reduced mechanical failure or breakage, resulting in improved durability.

In embodiments of a latch device and methods thereof, components do not appear on outer faces of the main body and the display. Accordingly, contact with external portions or a latch device and damage there to can be reduced. Further, an external appearance of the portable computer becomes simple.

Moreover, when the display is unfolded with respect to the main body according to embodiments of the present invention, the direction of a force for releasing the engaged state can be identical with that of a force for unfolding the display. Thus, operations for unfolding the display with respect to the main body can be performed at once or directly, which a results in improved user convenience.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A latch device for a portable computer having a display configured to be folded and unfolded about a hinge with respect to a main body of the portable computer, the latch device comprising:
    a magnet provided at an inner portion of one of the display or the main body; and
    a magnetic member provided at an inner portion of the other of the main body or the display corresponding to the inner portion of the display or the main body provided with the magnet,
    wherein the magnet is configured to exert a magnetic force on the magnetic member when the display is folded onto the main body so as to cause the display to be engaged with the main body, wherein the magnet is configured to be installed within a seating portion formed within a case defining an external surface of the display or the main body, further comprising a shield plate configured to shield the magnet installed within the seating portion.

2. The latch device as claimed in claim 1, wherein the magnetic member is one selected from the group of a metal plate, a magnet having a polarity opposite to that of the magnet, an electromagnetic device, a magnetic device or conductive materials.

3. The latch device as claimed in claim 1, wherein the magnet and the magnetic member are provided at front ends of the display and the main body, respectively, such that the magnet and the magnetic member are in close contact with inner surfaces of cases defining external surfaces of the display and the main body, respectively.

4. The latch device as claimed in claim 1, wherein at least one pair comprising the magnet and the magnetic member is provided.

5. The latch device as claimed in claim 1, wherein the shield plate is configured to be fastened to a fastening boss formed in the seating portion by a fastener, and wherein a pressing protrusion formed on an inner surface of the shield plate is configured to press and hold the magnet in position.

6. The latch device as claimed in claim 1, wherein the shield plate is made of a material capable of preventing the magnetic force of the magnet from penetrating therethrough.

7. The latch device as claimed in claim 1, wherein the magnet is configured to be installed within the seating portion formed on an inner surface of the case defining the external surface of the display or main body, and to be shielded by a cover made of a non-conductive material to reduce the magnetic force of the magnet impinging thereon.

8. The latch device as claimed in claim 2, wherein the magnet is seated in a holder in which only one side is open.

9. The latch device as claimed in claim 2, wherein the magnetic member comprising a metal plate is configured to be positioned on a support to be installed in close contact with an inner surface of a case defining an external surface of the display or the main body.

10. The latch device as claimed in claim 6, further comprising at least one catching hook and at least one guide boss formed on the seating portion with the magnetic member seated therein, wherein at least one catching hole formed in the cover is configured to engage the at least one catching hook, and at least one guide hole formed in the cover is configured to receive the at least one guide boss.

11. A latch device, comprising:
a first body portion and a second body portion coupled together to move between an open position and a closed position;
a first member installed in the first body portion;
a second member installed in the second body portion, wherein the first and second member are configured to engage each other using a magnetic force to maintain the first and second body portions in the closed position, wherein said first member is configured to be installed within a seating portion provided in the first body portion, and wherein the first body portion has a gap corresponding to said first member.

12. The latch device of claim 11, wherein the first member and the second member respectively include at least one magnet and at least one magnetic member, wherein a position of said at least one magnetic member on the second body portion corresponds to a position of said at least one magnet installed on the first body portion so as to draw the first and second body portions together and maintain the first and second body portions in an engaged position relative to one another in the closed position, and to disengage the first and second body portions upon application of a force in excess of a magnetic force between said at least one magnet and the at least one magnetic member.

13. The latch device as claimed in claim 12, wherein said at least one magnetic member is configured to be installed within a seating portion provided in the second body portion, and to be shielded by a cover.

14. The latch device as claimed in claims 11, wherein the first member and the second member can be electromagnetic, magnetic or conductive material.

15. A portable device comprising the latch device of claim 11.

16. The latch device as claimed in claim 12, wherein said at least one magnetic member comprises a metal plate configured to be positioned on a support provided in the second body portion.

17. The latch device as claimed in claim 12, further comprising a shield plate configured to shield said at least one magnet installed within the seating portion.

18. The latch device as claimed in claim 13, further comprising at least one catching hook and at least one guide boss formed on the seating portion with said at least one magnetic member seated therein, wherein at least one catching hole formed in the cover is configured to engage said at least one catching hook, and at least one guide hole formed in the cover is configured to receive said at least one guide boss.

19. The latch device as claimed in claim 17, wherein the shield plate comprises a material capable of reducing the magnetic force of said at least one magnet from penetrating therethrough.

20. The latch device as claimed in claim 17, wherein the shield plate is made of a non-conductive material to reduce the magnetic force of the magnet impinging thereon.

21. The latch device as claimed in claim 17, further comprising a pressing protrusion configured to press and to hold the at least one magnet in position.

22. A latch device for a portable appliance having a display configured to be folded and unfolded with respect to a main body of the portable computer, the latch device comprising:
a first magnetic member proximate to an inner portion of a case of the display; and
a second magnetic member proximate to an inner portion of a case of the main body and positioned in the main body so as to correspond to a position of the first magnetic member in the case of the display when the display is folded with respect to the main body, wherein the magnetic members are configured to exert a magnetic force on the each other when the display is folded with respect to the main body so as to maintain a folded position of the display with respect to the main body, wherein at least one inner portion has a gap corresponding to the installed first magnetic member or the second magnetic member.

23. The latch device for a portable computer of claim 22, further comprising a shield plate configured to shield one of the first magnetic member and the second magnetic member installed on the case.

24. The latch device for a portable computer of claim 22, wherein one of the first and second magnetic members can be electromagnetic, magnetic or conductive material.

25. A method of assembling a portable computer, comprising:
coupling a first body portion and a second body portion together to move between an open position and a closed position;
providing a first member in the first body portion;
providing a second member in the second body portion, wherein the first and second member are configured to engage each other using a magnetic force to maintain the first and second body portions in the closed position; and providing a shield plate configured to shield at least one of the first member and the second member installed within the corresponding body portion.

26. The method of claim 25, comprising:

providing a gap in a case of the first body portion or the second body portion respectively corresponding to the first member or the second member.

27. A portable computer having a latch device, comprising:

a display of the portable computer including a display screen configured to display data;

a main body of the portable computer configured with a hinge along a rear edge of the main body and at least one input device on a top surface, wherein the display is configured to be folded and unfolded about the hinge with respect to the main body;

a latch device comprising, a magnet provided at an inner portion of one of the display or the main body, and a magnetic member provided at an inner portion of the other of the main body or the display at a position corresponding to the magnet;

wherein the magnet is configured to exert a magnetic force on the magnetic member when the display is folded onto the main body so as to cause the display to remain engaged with the main body, and wherein the display has a shape corresponding to the main body so that the display screen and the top surface are completely covered and protected when the display is folded onto the main body.

28. The portable computer of claim 27, wherein the latch device is positioned along an adjacent side of the main body opposite the rear side.

* * * * *